United States Patent
Nonaka

(10) Patent No.: US 6,827,338 B2
(45) Date of Patent: Dec. 7, 2004

(54) SCAVENGING AIR/FUEL-AIR MIXTURE CONTROL DEVICE FOR A STRATIFIED SCAVENGING TWO-CYCLE ENGINE

(75) Inventor: Takumi Nonaka, Iwate-ken (JP)

(73) Assignee: Zama Japan (JP)

( * ) Notice: Subject to any disclaimer, the term of this patent is extended or adjusted under 35 U.S.C. 154(b) by 0 days.

(21) Appl. No.: 10/672,422

(22) Filed: Sep. 26, 2003

(65) Prior Publication Data

US 2004/0055546 A1 Mar. 25, 2004

Related U.S. Application Data

(63) Continuation of application No. 10/193,741, filed on Jul. 9, 2002, now Pat. No. 6,662,767.

(30) Foreign Application Priority Data

Sep. 27, 2001 (JP) ........................................ 2001-295658

(51) Int. Cl.[7] .............................................. F02M 9/02
(52) U.S. Cl. ................ 261/44.3; 123/73 A; 123/73 PP; 261/44.6; 261/44.8; 261/47; 261/DIG. 1
(58) Field of Search ............................... 261/44.3, 44.6, 261/44.8, 46–48, DIG. 1; 123/73 A, 73 PP, 73 V, 585

(56) References Cited

U.S. PATENT DOCUMENTS

| | | | | | |
|---|---|---|---|---|---|
| 2,169,622 | A | * | 8/1939 | Weiertz et al. | 123/586 |
| 2,223,381 | A | * | 12/1940 | Mock | 261/46 |
| 4,271,096 | A | * | 6/1981 | Kobayashi | 261/44.8 |
| 4,380,516 | A | * | 4/1983 | Matsuzaka | 261/23.2 |
| 4,481,152 | A | * | 11/1984 | Kobayashi et al. | 261/35 |
| 4,481,153 | A | * | 11/1984 | Kobayashi et al. | 261/44.8 |
| 4,497,286 | A | * | 2/1985 | Masuda | 123/184.52 |
| 5,599,484 | A | * | 2/1997 | Tobinai | 261/44.2 |
| 6,257,179 | B1 | * | 7/2001 | Uenoyama et al. | 123/65 R |
| 6,267,088 | B1 | * | 7/2001 | Rosskamp et al. | 123/73 PP |
| 6,298,811 | B1 | * | 10/2001 | Sawada et al. | 123/73 A |
| 6,328,288 | B1 | * | 12/2001 | Gerhardy | 261/35 |
| 6,334,606 | B1 | * | 1/2002 | Tobinai et al. | 261/23.3 |
| 6,418,891 | B2 | * | 7/2002 | Kobayashi | 123/73 PP |
| 6,431,527 | B1 | * | 8/2002 | Suzuki et al. | 261/44.3 |
| 6,591,794 | B2 | | 7/2003 | Toda | 123/73 A |
| 6,708,958 | B1 | * | 3/2004 | Warfel et al. | 261/45 |
| 2001/0011531 | A1 | * | 8/2001 | Uenoyama et al. | 123/65 R |
| 2001/0020454 | A1 | | 9/2001 | Kobayashi | 123/73 A |
| 2002/0020370 | A1 | | 2/2002 | Araki | 123/73 PP |
| 2002/0124817 | A1 | | 9/2002 | Abei | 123/73 C |

FOREIGN PATENT DOCUMENTS

| JP | 9-125966 | 5/1997 |
|---|---|---|
| JP | 9-287521 | 11/1997 |
| JP | 10-252565 | 9/1998 |

* cited by examiner

*Primary Examiner*—Richard L. Chiesa
(74) *Attorney, Agent, or Firm*—Orrick Herrington & Sutcliffe LLP

(57) ABSTRACT

The present invention facilitates proper control of the scavenging air and fuel-air mixture for a stratified scavenging two-cycle engine that is based on a crankcase compression/scavenging method, using any carburetor. The present invention includes a drive member, which rotates based on an accelerator operation, installed on the air valve of the air passage, wherein the drive member is movable through angular reciprocal movements. A slave member, which constantly contacts a cam provided on the drive member is installed on the throttle valve of the carburetor, and wherein the slave member is movable through linear reciprocal movements. A fuel flow-rate controlling mechanism works in cooperation with these linear reciprocal movements. The carburetor can be freely designed without regard to the orientation of the air passage and a looseness- and play-free interlocking mechanism having a cam and a spring can maintain the air valve and the throttle valve in a proper opening relationship, thereby stably operating the engine without upsetting the air/fuel ratio.

24 Claims, 3 Drawing Sheets

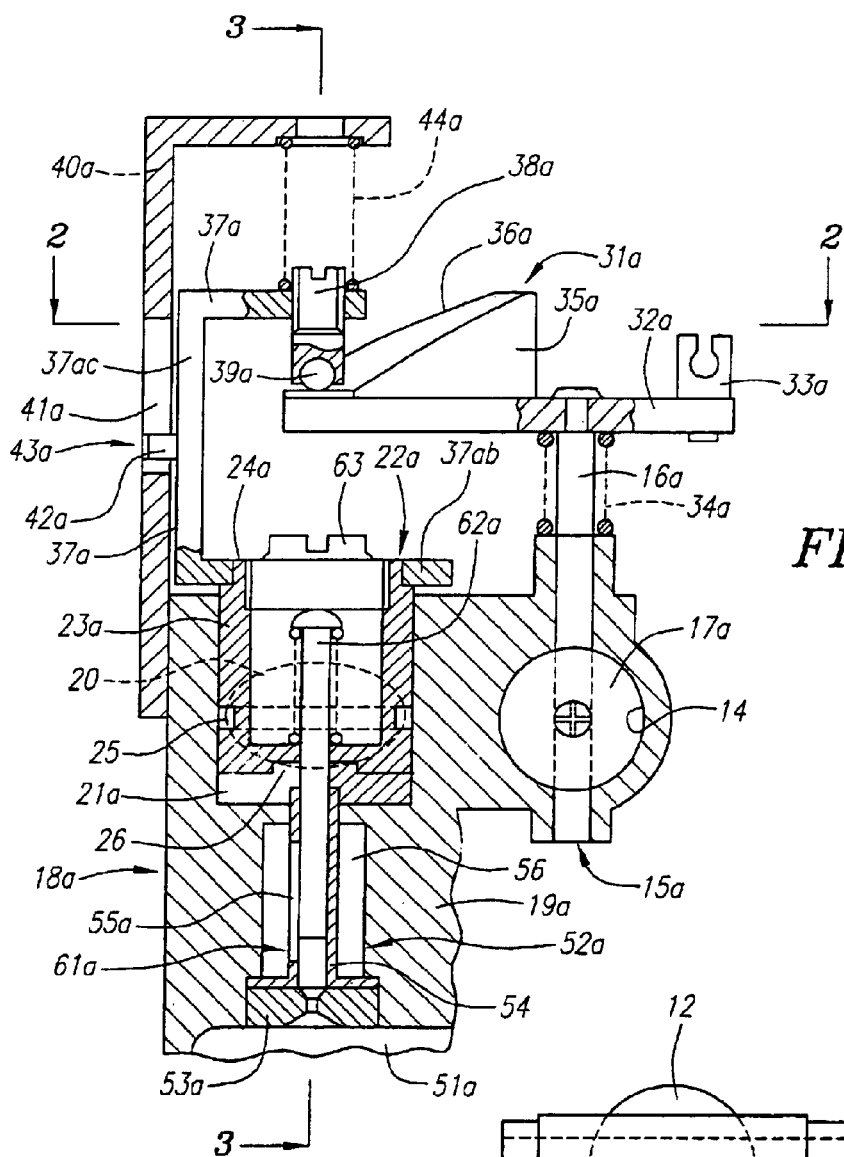
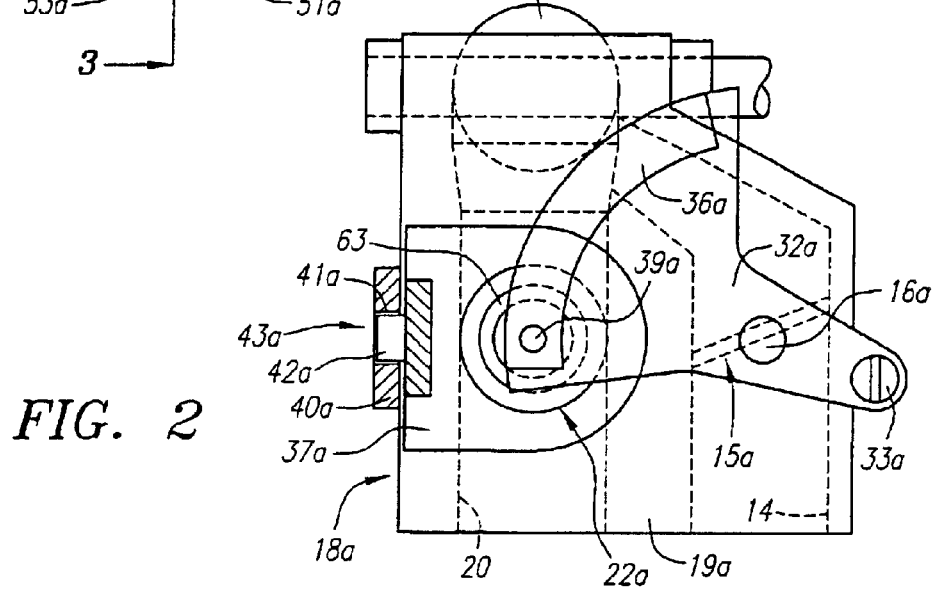
FIG. 1
FIG. 2

SCAVENGING AIR/FUEL-AIR MIXTURE CONTROL DEVICE FOR A STRATIFIED SCAVENGING TWO-CYCLE ENGINE

CROSS-REFERENCE TO RELATED APPLICATION

This application is a continuation of application Ser. No. 10/193,741 filed Jul. 9, 2002, now U.S. Pat. No. 6,662,767, which application is fully incorporated herein by reference.

FIELD OF THE INVENTION

The present invention relates to a crankcase compression/scavenging method and, more particularly, to a scavenging air/fuel-air mixture control device for a stratified scavenging two-cycle engine that is designed to first sweep out the combustion gas by introducing air into the combustion chamber during scavenging and then to introduce a fuel-air mixture.

BACKGROUND OF THE INVENTION

For a two-cycle engine in which a fuel-air mixture inside a combustion chamber ignites and explodes, pushing down the piston, the exhaust port first opens to begin exhausting the combustion gas, and then the scavenging port opens, introducing the fuel-air mixture supplied to the crankcase into the combustion chamber to exhaust the remaining combustion gas, a known alternative includes an air passage that is connected to the scavenging passage linking the crankcase and the combustion chamber. When the scavenging port opens, the scavenging air in the air passage is first introduced into the combustion chamber to exhaust the combustion gas, and then the fuel-air mixture in the crankcase is introduced into the combustion chamber via the scavenging passage.

The air valve for controlling the scavenging air flow rate, provided in the air passage, and the throttle valve for controlling the output of the carburetor, which is a fuel-air mixture formation means provided in the fuel-air mixture passage connected to the crankcase, must be coordinated with each other in order to prevent incomplete combustion and to stabilize engine operation. To achieve such an objective, the air passage and the fuel-air mixture passage are positioned adjacent to each other vertically, and then the air valve and the throttle valve are integrated to make them work together as described in JP H10-252565; or in configurations in which the air passage and the fuel-air mixture passage are positioned in other ways, the air valve and the throttle valve work together via a linking mechanism as described in JP H9-125966 and JP H9-287521.

In the aforementioned configuration in which the air passage and the fuel-air mixture passage are positioned adjacent to each other vertically and are integrated, the interlocking mechanism for the air valve and the throttle valve is either unnecessary or can be extremely simple. Thus, it is easy to keep these two valves coordinated at proper degrees of opening. However, such a configuration places significant restrictions on the carburetor structure and on the positioning of various mechanisms, significantly reducing the degree of design freedom and making it impossible to incorporate it into an existing carburetor as is, thereby resulting in inconvenience.

On the other hand, the configuration in which the air valve and the throttle valve work together via a linking mechanism can accept either an existing or a freely-designed carburetor. However, manufacturing variations in the linking mechanism and the required clearance in the link junction make it difficult to maintain a proper opening relationship between the air valve and the throttle valve. A particular concern exists in that such a configuration may upset the air/fuel ratio in that partial load region, thereby lowering engine performance.

BRIEF DESCRIPTION OF THE DRAWINGS

FIG. 1 is a vertical cross-sectional diagram illustrating the first embodiment of the present invention.

FIG. 2 is a cross-sectional diagram along line A—A in FIG. 1.

SUMMARY OF THE INVENTION

Figure 3:
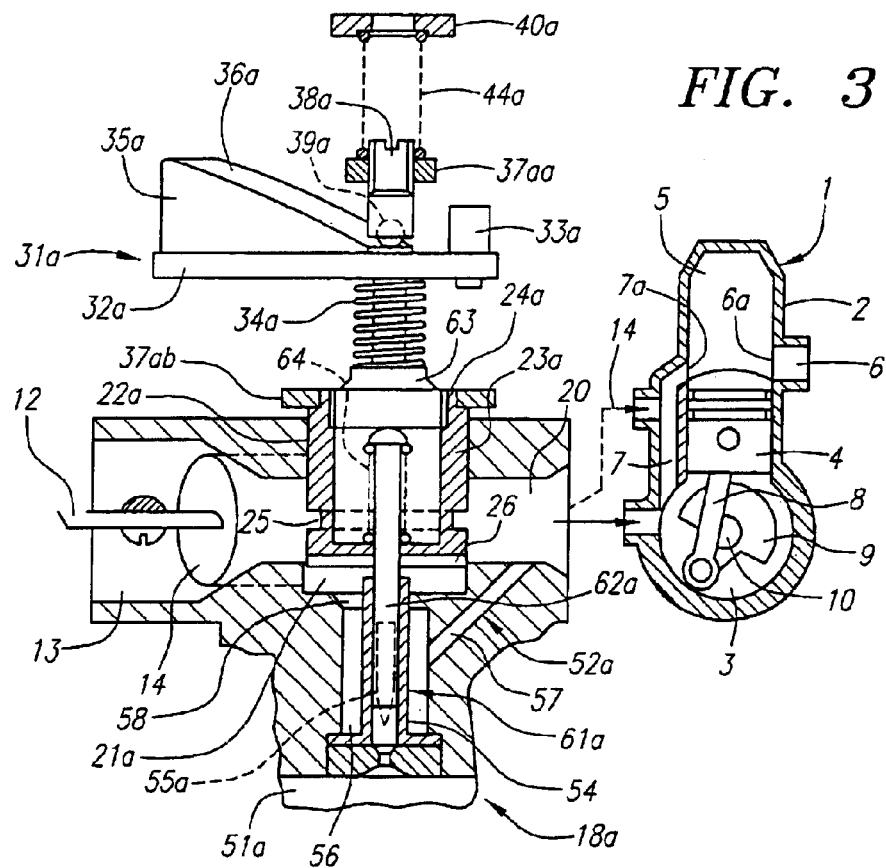
FIG. 3 is a cross-sectional diagram along line B—B in FIG. 1.

The present invention has been developed in order to solve the aforementioned problems, and its objective is to provide a scavenging air/fuel-air mixture control device that can incorporate freely-designed carburetors into the fuel-air mixture passages, and that can also maintain the opening relationship between the mutually separate air valve and throttle valve by linking them via an interlocking mechanism that is free from looseness or play.

In order to solve the aforementioned problems, the scavenging air/fuel-air mixture control device of the present invention is provided with an air valve for controlling the scavenging air flow rate that is installed in the air passage connected to the scavenging passage for linking the crankcase with the combustion chamber. The air valve opens and closes the air passage through angular reciprocal movements of its valve body. A throttle valve for controlling the output is provided on the carburetor incorporated in the fuel-air mixture passage connected to the crankcase. The throttle valve opens and closes the fuel-air mixture passage through linear reciprocal movements of its valve body. An interlocking mechanism provided for the air valve and the throttle valve includes a flow rate-controlling mechanism for the fuel to be sent into the fuel-air mixture passage.

The interlocking mechanism has a drive member that is fixed to the valve shaft of the air valve and rotates based on accelerator operation, and a slave member that linearly reciprocates by following a cam provided on the drive member. The cam is fixed onto the valve shaft of the throttle valve. The interlocking mechanism opens and closes the air valve and the throttle valve in relation with each other in response to accelerator operation. The fuel flow rate-controlling mechanism has a metering needle provided on the throttle valve and a metering window provided in the fuel passage leading from the constant fuel chamber to the fuel-air mixture passage. The flow rate of the fuel to be sent into the fuel-air mixture passage is controlled by having the metering needle vary the open area of the metering window according to the degree of opening of the throttle valve.

According to the present invention, by having the air valve and the throttle valve as separate members that are linked through an interlocking mechanism, the carburetor structure and various mechanisms can be freely designed to achieve superior function, without being subjected to the restrictions of the air passage. Moreover, fixing the drive member, which is equivalent to the throttle valve lever in an ordinary carburetor, to the valve shaft of the air valve and having its cam make the slave member on the throttle valve side linearly reciprocate, tends to eliminate looseness or play between the air valve and the throttle valve, thereby properly maintaining their opening relationship. Additionally, by utilizing the linear reciprocal movements of the throttle valve to control the fuel flow rate, the flow rates between the scavenging air and fuel-air mixture as well as the air/fuel ratio can be properly maintained over the entire engine operation range.

Further, objects and advantages of the invention will become apparent from the following detailed description and accompanying drawings.

DETAILED DESCRIPTION OF THE PREFERRED EMBODIMENTS

Figure 6:
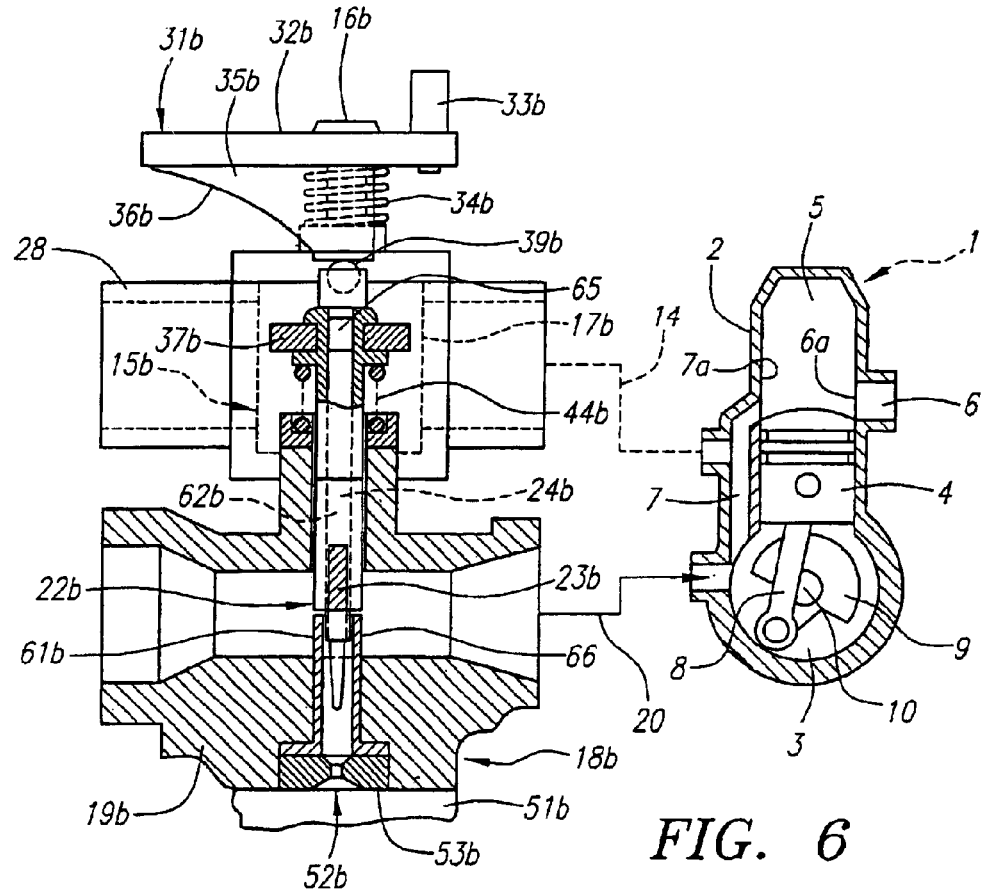
FIG. 6 is a cross-sectional diagram along line B—B in FIG. 4.

Before explaining the embodiments of the present invention with reference to the drawings, an engine overview is provided based on FIGS. 3 and 6. An engine 1 has a cylinder 2, a crankcase 3, and a piston 4. An exhaust port 6a, which is the inlet of an exhaust passage 6, and a scavenging port 7a, which is the outlet of a scavenging passage 7 linking the crankcase 3 and a combustion chamber 5 located above the piston 4, open into the cylinder 2. In addition, an air passage 14 is connected to a location near scavenging port 7a of the scavenging passage 7 and a fuel-air mixture passage 20 is connected to the crankcase 3.

When the piston 4 begins to ascend from the bottom dead center, the capacity of the crankcase 3 increases, and at the same time, the piston 4 closes the exhaust port 6a and the scavenging exhaust port 7a. As a result, the pressure inside the crankcase 3 and the scavenging passage 7 declines, drawing fuel-air mixture from the fuel-air mixture passage 20 into the crankcase 3, and drawing air from the air passage 14 into the scavenging passage 7 and then into the crankcase 3. When the piston 4 nears the top dead center, the fuel-air mixture that was supplied to the combustion chamber 5 in the previous stroke ignites and explodes, and when the piston 4 begins to descend, the pressure inside the crankcase 3 rises. Meanwhile, opening the exhaust port 6a and the scavenging port 7a exhausts the combustion gas inside the combustion chamber 5 to the exhaust passage 6; at the same time, the air inside the scavenging passage 7 jets into the combustion chamber 5, exhausting the remaining combustion gas. The fuel-air mixture that was drawn into the crankcase 3 is supplied into the combustion chamber 5 via the scavenging passage 7 following the air. The piston 4 then reaches the bottom dead center.

A crank shaft 10, which is connected via a connecting rod 8 and a crank arm 9 to the piston 4, which linearly reciprocates based on the repetition of the aforementioned strokes, rotates as in a conventional two-cycle engine.

FIGS. 1, 2, and 3 illustrate the first embodiment of the present invention. The area where an air valve 15A of the air passage 14 is provided is positioned alongside and near the fuel-air mixture passage 20 in a main body 19A of a carburetor 18A in which a throttle valve 22A of fuel-air mixture passage 20 is provided. Air that enters an air supply passage 13 via an air cleaner, not shown in the figure but connected to the air supply passage 13 provided with a choke valve 12, is branched into the two passages 14 and 20.

The air valve 15A is a conventional butterfly valve in which a disc-shaped valve body 17A is fixed onto a valve shaft 16A rotatably supported in the main body 19A.

A valve body 23A of the throttle valve 22A has a bottom, is cylindrical in shape, and is fitted into a valve hole 21A formed in the main body 19A perpendicularly to the fuel-air mixture passage 20. The tip on the open end of the valve body 23A protrudes outside the main body 19A and functions as a valve shaft 24A. A ring-shaped groove passage 25 is provided on the peripheral surface of the valve body 23A, and a guiding groove 26, which goes through in the direction of the fuel-air mixture passage 20, is provided on the bottom of the valve body 23A.

A plate-shaped drive member 32A is secured onto the valve shaft 16A of the air valve 15A. The drive member 32A, which is provided with a post 33A to which an accelerator cable is to be connected, rotates the air valve 15A in the opening direction as the driver operates the accelerator, and rotates the air valve 15A in the closing direction based on a return spring 34A, which consists of a helical coil spring installed surrounding the valve shaft 16A in the space between the drive member 32A and the main body 19A. That is, the drive member 32A is equivalent to a throttle valve lever that is fastened to the throttle valve shaft of the carburetor to open/close the throttle valve.

A cam 35A, whose cam surface 36A is oriented to the side opposite the air valve 15A, i.e., to the side opposite the main body 19A, is provided along an arc that is centered around the valve shaft 16A. A contact 39A, consisting of a ball rotatably held at the tip of an adjustment screw 38A screwed into one horizontal arm 37Aa of a c-shaped slave member 37A, contacts the cam surface 36A. The valve shaft 24A of the throttle valve 22A is secured onto the other horizontal arm 37Ab of the slave member 37A. A vertical arm 37Ac has a guiding protrusion 42A, which is fitted into a guiding groove 41A that extends in the vertical direction of a bracket 40A provided in the main body 19A.

A spring 44A, which works to keep the contact 39A in constant contact with the cam surface 36A, is installed between the top area of the bracket 40A, which extends in the horizontal direction, and the horizontal arm 37Aa, which supports the contact 39A. The spring 44A is a helical coil spring, and is engaged with the horizontal arm 37Aa so as to constantly press the valve body 23A of the throttle valve 22A, to which the slave member 37A is secured, to one side of the valve hole 21A.

The aforementioned drive member 32A, cam 35A, slave member 37A, and spring 44A comprise an interlocking mechanism 31A for the air valve 15A and the throttle valve 22A. The guiding groove 41A and the guiding protrusion 42A comprise a rotation-prevention mechanism 43A for the slave member 37A and the throttle valve 22A.

Next, a known diaphragm-based constant fuel chamber 51A is provided on the side opposite the aforementioned various mechanisms of the main body 19A. A main jet 53A is installed on top of the constant fuel chamber 51A, and a metering cylinder 54 is positioned on top of the main jet 53A. The metering cylinder 54 goes through a supply chamber 56 formed by an installation opening into which the main jet 53A and the metering cylinder 54 are fitted, with its tip protruding into the bottom of the valve hole 21A. The metering cylinder 54 has a vertically elongated triangular metering window 55A on the side that faces the supply chamber 56.

The supply chamber 56 and the downstream side of the throttle valve 22A of the fuel-air mixture passage 20 are connected via the supply passage 57; and the aforementioned main jet 53A, metering cylinder 54, supply chamber 56, and supply passage 57 comprise a fuel passage 52A, which extends from the constant fuel chamber 51A to the fuel-air mixture passage 20. An air bleed passage 58, which extends from the air supply passage 13, is connected to the supply chamber 56.

The base end of a metering needle 62A is inserted into the valve body 23A of the throttle valve 22A. The metering needle 62A is held by the valve body 23A by being pressed by a pressing spring 64 onto a plug 63, which plugs the opening of the valve body 23A. The tip of the metering needle 62A is inserted into the metering cylinder 54 without any gaps to speak of. The aforementioned metering window 55A and the metering needle 62A comprise a fuel flow-rate controlling mechanism 61A, and the idling fuel flow rate can be adjusted by changing how deeply the plug 63 is screwed in.

The air valve 15A and the throttle valve 22A related to the present embodiment having the aforementioned configuration are placed in positions that close the air passage 14 and the fuel-air mixture passage 20, respectively, when the engine is being idled. The groove passage 25 and the guiding groove 26 of the throttle valve 22A are positioned in the maximum width area and bottom area, respectively, of the fuel-air mixture passage 20, allowing the air to pass at the flow rate required for idling. During idling, the metering needle 62A is placed in a position that slightly opens the metering window 55A, allowing the fuel to pass at the flow rate required for idling.

When the driver operates the accelerator, thereby rotating the drive member 32A, the air valve 15A opens, gradually increasing the flow rate of the scavenging the air flowing through the air passage 14. Simultaneously, the cam surface 36A pushes up the contact 39A, moving the valve body 23A of the throttle valve 22A secured to the slave member 37A in the direction out of the valve hole 21A. The valve-opening action increases the opening area of the fuel-air mixture passage 20, and at the same time, the metering needle 62A moves with the valve body 23A to increase the opening area of the metering window 55A, increasing the flow rate of the fuel-air mixture while maintaining a predetermined air/fuel ratio.

According to the present embodiment, by turning the adjustment screw 38A, which holds the contact 39A, the heights of the slave member 37A and the throttle valve 22A can be changed, thus adjusting the idle opening of the throttle valve 22A. Having the spring 44A make the contact 39A of the slave member 37A constantly contact the cam surface 36A, and having the drive member 32A and the slave member 37A secured onto the valve shafts 16A and 24A, respectively, tends to eliminate looseness or play in the interlocking mechanism 31A for the air valve 15A and the throttle valve 22A, thus properly maintaining their opening relationship.

Furthermore, according to the present embodiment, the use of a helical coil spring for the spring 44A can press the valve body 23A of the throttle valve 22A to one side of the valve hole 21A, and can keep the guiding protrusion 42A of the rotation-prevention mechanism 43A pressed against one side of the guiding groove 41A, ensuring stable linear reciprocal movements without looseness. Moreover, since the contact 39A and the spring 44A are positioned on the central axis of the throttle valve 22A, even more stable linear reciprocal movements of the cam 35A can be achieved.

Additionally, the present embodiment provides an advantage in the ring-shaped groove passage 25 and the guiding groove 26, which is in the direction of the fuel-air mixture passage 20, provided on the valve body 23A of the throttle valve 22A, can make the air flow during idling uniform and can prevent fuel clogging by discharging any fuel that might enter the valve hole 21A by traveling around the metering needle 62A. Furthermore, the entire fuel-air mixture passage 20 or the front and back of the throttle valve 22A, i.e., nearly the entire area spanning from the entrance area to the exit area, has an elliptical shape whose minor axis is in the direction of the linear reciprocal movements of the throttle valve 22A and whose major axis is in the direction perpendicular to the minor axis. This flattened shape can increase the cross-sectional area of the fuel-air mixture passage 20 or reduce the overall height of the device by decreasing the strokes of the linear reciprocal movements.

Figure 4:
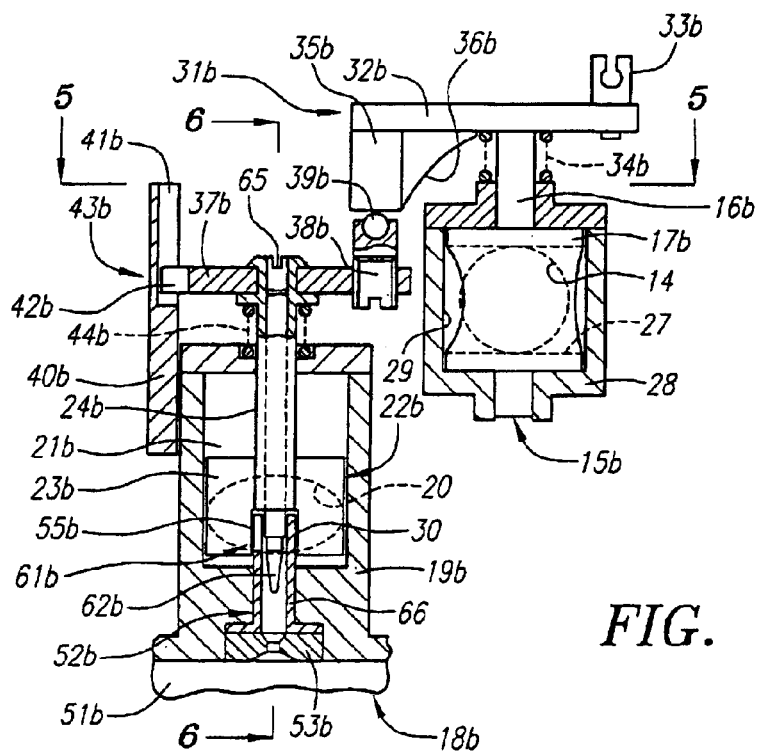
FIG. 4 is a vertical cross-sectional diagram illustrating the second embodiment of the present invention.
Figure 5:
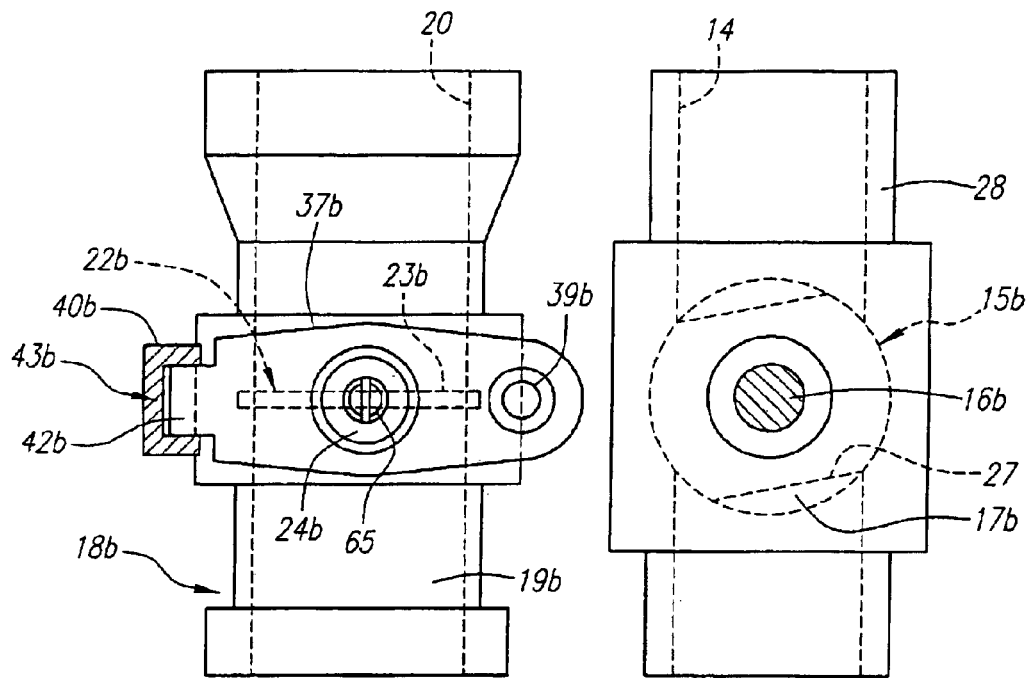
FIG. 5 is a cross-sectional diagram along line A—A in FIG. 4.

FIGS. 4, 5, and 6 illustrate a second embodiment of the present invention, in which the air passage 14 and the fuel-air mixture passage 20 are separate and independent from each other without having a common body. The air cleaners for the entrances of these passages may be either independent or shared.

An air valve 15B provided in the air passage 14 is a widely-known rotary valve, which consists of a cylindrical valve body 17B, in which a throughhole 27 having the same diameter as the air passage 14 is provided in the diameter direction, and a valve shaft 16B; which is rotatably supported by a body 28 by fitting the valve body 17B in a valve hole 29 provided by placing the air passage 14 orthogonally relative to the body 28.

A valve body 23B of a throttle valve 22B, which is one of the components of a carburetor 18B, is a rectangular flat plate which is fitted into a flat valve hole 21B formed in a main body 19B orthogonally to the fuel-air mixture passage 20. A valve shaft 24B, which extends from the center of the valve body 23B, protrudes to the outside of the main body 19B. The valve body 23 has a notch-shaped opening 30 in the middle of the opposite side.

A flat plate-shaped drive member 32B provided with a post 33B for connecting the accelerator cable is secured to the valve shaft 16B of the air valve 15B, and rotates the air valve 15B in the opening direction as the driver operates the accelerator. A return spring 34B, which consists of a helical coil spring installed surrounding the valve shaft 16B in the space between the drive member 32B and the body 28, rotates the air valve 15B in the closing direction.

A cam 35B, whose cam surface 36B is oriented toward the air valve 15B, i.e., toward the body 28, is provided along an arc that is centered around the valve shaft 16B. Meanwhile, a flat plate-shaped slave member 37B is secured to the valve shaft 24B of the throttle valve 22B, and a contact 39B consisting of a ball rotatably held at the tip of an adjustment screw 38B screwed into the slave member 37B contacts the cam surface 36B.

A guiding protrusion 42B is provided on the tip opposite from the adjustment screw 38B across the valve shaft 24B of the slave member 37B, and is fitted into a guiding groove 41B of a bracket 40B provided on the main body 19B. Furthermore, a spring 44B, which works to keep the contact 39B in constant contact with the cam surface 36B, is installed between the main body 19B and the slave member 37B, surrounding the valve shaft 24B. The spring 44B is a helical coil spring, and is engaged with the slave member 37B so as to constantly press the valve body 23B and guiding the protrusion 42B to one side of a valve hole 21B and of the guiding groove 41B, respectively.

The aforementioned drive member 32B, cam 35B, slave member 37B, and spring 44B comprise an interlocking mechanism 31B for the air valve 15B and the throttle valve 22B. The guiding groove 41B and the guiding protrusion 42B comprise a rotation-prevention mechanism 43B for the slave member 37B and the throttle valve 22B. Of course, in the present embodiment, the valve body 23B of the throttle valve 22B is a flat plate and is fitted into a flat valve hole 21B, which functions as a rotation-prevention mechanism, and therefore the aforementioned rotation-prevention mechanism 43B may be omitted. However, providing the rotation-prevention mechanism 43B can ensure smooth linear reciprocal movements without applying a twisting force to the valve body 23B or valve shaft 24B.

Next, a known diaphragm-based constant fuel chamber 51B is provided on the side opposite the aforementioned various mechanisms of the main body 19B, and a fuel nozzle 66 is positioned on top of a main jet 53B provided on top of this constant fuel chamber 51B. The fuel nozzle 66 protrudes from the bottom of the valve hole 21B into the fuel-air mixture passage 20, and a metering window 55B, which extends in the vertical direction, is provided on the side of the area facing the fuel-air mixture passage 20. The aforementioned main jet 53B and the fuel nozzle 66 comprise a fuel passage 52B, which extends from the constant fuel chamber 51B to the fuel-air mixture passage 20.

An opening 30 provided in the valve body 23B of the throttle valve 22B is designed to surround the part of the fuel nozzle 66 protruding into the fuel-air mixture passage 20 with a gap in the idling position, allowing the air to pass through this gap at the flow rate required for idling. Moreover, a metering needle 62B goes through the valve shaft 24B on its central axis, and the metering needle 62B is held by valve shaft 24B having its tip inserted into the fuel nozzle 66 and a screw 65 at its base screwed into the valve shaft 24B such that it can adjust the idling fuel flow rate. The aforementioned metering window 55B and the metering needle 62B comprise a fuel flow-rate controlling mechanism 61B.

The air valve 15B and the throttle valve 22B related to the present embodiment having the aforementioned configuration are placed in positions that close the air passage 14 and the fuel-air mixture passage 20, respectively, when the engine is being idled. Air at the flow rate required for idling flows through the gap formed between the opening 30 of the throttle valve 22B and the fuel nozzle 66. During this step, the metering needle 62B is placed in a position that slightly opens the metering window 55B, allowing the fuel to pass at the flow rate required for idling.

When the driver operates the accelerator, thereby rotating the drive member 32A, the air valve 15B opens, gradually increasing the flow rate of the scavenging air flowing through the air passage 14. At the same time, the slave member 37B is pushed up along the cam surface 36B by the spring 44B, pulling up the valve body 23B of the throttle valve 22B. The valve-opening action increases the opening area of the fuel-air mixture passage 20, and at the same time, the metering needle 62B moves with the valve body 23B to increase the opening area of the metering window 55B, increasing the flow rate of the fuel-air mixture while maintaining a predetermined air/fuel ratio.

The present embodiment can also provide the same effects as the first embodiment, i.e., the adjustment screw 38B can be used to adjust the idling opening of the throttle valve 22B, the opening relationship between the air valve 15B and the throttle valve 22B can be properly maintained without looseness or play in the interlocking mechanism 31B, and the flattened shape of the fuel-air mixture passage 20 can increase its cross-sectional area or reduce the overall height of the device.

Additionally, the present embodiment provides the advantage of a simpler overall structure because of the fact that the shape of the slave member 37B is simple and the rotation-prevention mechanism 43B may be omitted. Furthermore, as shown in FIG. 4, since the air passage 14 can be positioned at a higher location than the fuel-air mixture passage 20, the passage leading to the scavenging passage of the engine can be shortened and the shape of the passage can be simplified, which constitute additional advantages.

As explained above, according to the present invention, there are no restrictions on the carburetors that can be used, and any freely-designed carburetor can be incorporated into the fuel-air mixture passage; and the air valve and the throttle valve can be maintained at a proper opening relationship by linking them through an interlocking mechanism that is free of looseness or play, thereby ensuring optimum engine performance over the entire operation range.

While various preferred embodiments of the invention have been shown for purposes of illustration, it will be understood that those skilled in the art may make modifications thereof without departing from the true scope of the invention as set forth in the appended claims including equivalents thereof.

What is claimed is:

1. An air/fuel-air mixture control device comprising:
    an air valve for controlling air flow rate provided in an air passage, the air valve opens and closes the air passage based on the angular reciprocal movements of its valve body;
    an output-controlling throttle valve incorporated in a fuel-air mixture passage provided in a carburetor, the throttle valve opens and closes the fuel-air mixture passage based on the linear reciprocal movements of its valve body; and
    an interlocking mechanism interlocking the air valve with the throttle valve and a flow-rate controlling mechanism for fuel to be sent into the fuel-air mixture passage; the interlocking mechanism translates rotational movement of the air valve into linear movement of the throttle valve to open and close the air valve and throttle valve in relation to one another in response to accelerator operations, and wherein the interlocking mechanism comprises a drive member secured to the air valve, a cam provided in the drive member, and a slave member secured to the throttle valve and operably coupled to the cam, the slave member goes through linear reciprocal movements by following the cam.

2. The control device of claim 1 further comprising a spring for keeping the slave member in constant contact with a cam surface of the cam.

3. The control device of claim 2 wherein the slave member comprises, a rotation-prevention mechanism that prevents the slave member and the throttle valve from rotating.

4. The control device of claim 2, wherein the cam surface faces away from the air valve, and wherein a spring applies a force to the slave member in the throttle valve closing direction, keeping the slave member in constant contact with the cam surface.

5. The control device of claim 2, wherein the cam surface faces toward the air valve, and wherein the spring applies a force to the slave member in the throttle valve opening direction, keeping the slave member in constant contact with the cam surface.

6. The control device of claim 1, including a helical coil spring, which keeps the slave member in constant contact with a cam surface of the cam and constantly presses the throttle valve to one side.

7. The control device of claim 1, wherein the throttle valve has a cylindrical body with a grooved passage on its periphery, and is positioned to completely close the fuel-air mixture passage during idling, allowing the air required for idling to flow through the grooved passage.

8. The control device of claim 1, wherein the throttle valve has a flat plate body having an opening, and is positioned to completely close the fuel-air mixture passage during idling, allowing the air required for idling to flow through the opening.

9. The control device of claim 1, wherein the fuel-air mixture passage in an area of the throttle valve, has an elliptical shape whose minor axis is in the direction of the linear reciprocal movements of the throttle valve and whose major axis is in the direction perpendicular to the minor axis.

10. The control device of claim 1, wherein the fuel passage has a main jet, a metering cylinder having a metering window and positioned downstream from the main jet at least partially within a supply chamber, and a supply passage connecting the supply chamber with the fuel-air mixture passage on a downstream side of the throttle valve, and wherein the metering needle is inserted into the metering cylinder to vary the opening area of the metering window.

11. The control device of claim 10, wherein an air bleed passage is connected to the supply chamber.

12. The control device of claim 1, wherein the fuel passage comprises a main jet and a fuel nozzle positioned downstream from the main jet with its tip protruding into the fuel-air mixture passage and a metering window on the side of its tip, wherein the metering needle is inserted into the fuel nozzle to vary the opening area of the metering window, and wherein the opening of the throttle valve is a depression that, in the idling position, surrounds the tip of the fuel nozzle while leaving a gap for allowing the air required for idling to pass through.

13. A carburetor system comprising:
   an air passage,
   an air valve rotatably positioned within the air passage, the air valve rotates to open and close the air passage;
   a fuel-air mixture passage,
   a throttle valve incorporated in the fuel-air mixture passage, the throttle valve opens and closes the fuel-air mixture with linear reciprocal movements;
   an interlocking mechanism coupled to the air valve and the throttle valve, the interlocking mechanism translates rotational movement of the air valve into linear movement of the throttle valve to open and close the air valve and throttle valve in relation to one another, wherein the interlocking mechanism comprises a cam secured to the air valve and a slave member secured to the throttle valve and operably coupled to the cam, the slave member goes through linear reciprocal movements by following the cam; and
   a fuel flow-rate controlling mechanism coupled to the interlocking mechanism.

14. The carburetor system of claim 13 wherein the fuel flow-rate controlling mechanism comprises a metering needle and a metering window provided in a fuel passage leading from a constant fuel chamber to the fuel-air mixture passage, wherein the metering needle varies the opening of the metering window in relation to the opening and closing of the throttle valve.

15. The carburetor system of claim 13 further comprising a spring for keeping the slave member in constant contact with a cam surface of the cam.

16. The carburetor system of claim 15 wherein the slave member comprises a rotation-prevention mechanism that prevents the slave member and the throttle valve from rotating.

17. The carburetor system of claim 15, wherein the cam surface faces away from the air valve, and wherein a spring applies a force to the slave member in the throttle valve closing direction, keeping the slave member in constant contact with the cam surface.

18. The carburetor system of claim 15, wherein the cam surface faces toward the air valve, and wherein the spring applies a force to the slave member in the throttle valve opening direction, keeping the slave member in constant contact with the cam surface.

19. The carburetor system of claim 13, wherein the throttle valve has a cylindrical body with a grooved passage on its periphery, and is positioned to completely close the fuel-air mixture passage during idling, allowing the air required for idling to flow through the grooved passage.

20. The carburetor system of claim 13, wherein the throttle valve has a flat plate body having an opening, and is positioned to completely close the fuel-air mixture passage during idling, allowing the air required for idling to flow through the opening.

21. The carburetor system of claim 13, wherein the fuel-air mixture passage in an area of the throttle valve, has an elliptical shape whose minor axis is in the direction of the linear reciprocal movements of the throttle valve and whose major axis is in the direction perpendicular to the minor axis.

22. The carburetor system of claim 13, wherein the fuel passage has a main jet, a metering cylinder having a metering window and positioned downstream from the main jet at least partially within a supply chamber, and a supply passage connecting the supply chamber with the fuel-air mixture passage on a downstream side of the throttle valve, and wherein the metering needle is inserted into the metering cylinder to vary the opening area of the metering window.

23. The carburetor system of claim 22, wherein an air bleed passage is connected to the supply chamber.

24. The carburetor system of claim 13, wherein the fuel passage comprises a main jet and a fuel nozzle positioned downstream from the main jet with its tip protruding into the fuel-air mixture passage and a metering window on the side of its tip, wherein the metering needle is inserted into the fuel nozzle to vary the opening area of the metering window, and wherein the opening of the throttle valve is a depression that, in the idling position, surrounds the tip of the fuel nozzle while leaving a gap for allowing the air required for idling to pass through.

* * * * *